(12) United States Patent
Schüler et al.

(10) Patent No.: US 7,585,245 B2
(45) Date of Patent: Sep. 8, 2009

(54) GEAR STAGE

(75) Inventors: Rolf Schüler, Heiligenhaus (DE); Michael Berres, Leverkusen (DE); Bernd Bossmanns, Erkrath (DE); Karsten Kalmus, Bochum (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 52 days.

(21) Appl. No.: 12/070,662

(22) Filed: Feb. 20, 2008

(65) Prior Publication Data

US 2008/0146394 A1 Jun. 19, 2008

Related U.S. Application Data

(63) Continuation of application No. PCT/EP2006/008102, filed on Aug. 17, 2006.

(30) Foreign Application Priority Data

Aug. 23, 2005 (DE) ............ 10 2005 039 733
Feb. 9, 2006 (DE) ............ 10 2006 005 906

(51) Int. Cl.
*F16H 1/32* (2006.01)
(52) U.S. Cl. .......... 475/166; 475/168; 475/170
(58) Field of Classification Search .......... 475/165, 475/166, 168–170
See application file for complete search history.

(56) References Cited

U.S. PATENT DOCUMENTS

| | | | |
|---|---|---|---|
| 2,831,373 A | 4/1958 | Weis | |
| 2,868,039 A | * 1/1959 | Lee | ............ 475/165 |
| 3,248,960 A | 5/1966 | Schottler | |
| 3,348,749 A | * 10/1967 | Zahn | ............ 226/59 |
| 4,429,595 A | * 2/1984 | Butterfield | ............ 475/168 |
| 4,592,247 A | 6/1986 | Mutschler | |
| 5,016,487 A | 5/1991 | Bollmann | |

(Continued)

FOREIGN PATENT DOCUMENTS

CH 356 972 9/1961

(Continued)

OTHER PUBLICATIONS

Hrsg. Von W. Beitz Und K.-H. Grote, "Dubbel, Taschenbuch für den Maschinenbau", pp. G116-G119, 2001 Edition, 20. Aufl, Springer-Verlag Berlin Heidelberg New York.

(Continued)

*Primary Examiner*—Ha D. Ho
(74) *Attorney, Agent, or Firm*—Womble Carlyle Sandridge & Rice, PLLC

(57) ABSTRACT

A gear step (1) for an actuator in a motor vehicle, in particular for a vehicle seat, comprises a housing (3) provided with a drive (1) mounted thereon in such a way that it is rotatable around an axis (A), and a driven output (21) rotatable about a second axis (B) differing from the axes (A). The drive (11) is used for receiving the driven output (21) by way of at least one rolling body (31), so that the axes (A, B) are parallelly offset by an eccentricity (E) and the driven output is driven by rotating the thus obtained rolling eccentricity, wherein the driven output (21) carries out a tumbling rolling movement on the housing (3) by way of a friction oscillating gear (33, 35).

33 Claims, 5 Drawing Sheets

U.S. PATENT DOCUMENTS

| | | | | |
|---|---|---|---|---|
| 5,876,298 | A | * | 3/1999 | Kato et al. ............... 475/162 |
| 5,964,676 | A | * | 10/1999 | Rennerfelt ............... 475/163 |
| 6,076,628 | A | * | 6/2000 | Pattok et al. ............... 180/444 |
| 6,212,965 | B1 | | 4/2001 | Hochmuth |
| 6,270,345 | B1 | * | 8/2001 | Abbott et al. ............... 433/132 |
| 6,592,186 | B1 | | 7/2003 | Mühlberger et al. |
| 6,601,467 | B1 | | 8/2003 | Fütterer |
| 6,676,554 | B2 | * | 1/2004 | Dal Pra' ............... 475/149 |
| 7,294,081 | B2 | | 11/2007 | Schüler et al. |
| 7,329,200 | B2 | | 2/2008 | Schüler et al. |
| 2003/0214165 | A1 | | 11/2003 | Finner et al. |
| 2007/0020125 | A1 | * | 1/2007 | Oyama et al. ............... 417/415 |
| 2007/0029888 | A1 | | 2/2007 | Schüler et al. |
| 2007/0029893 | A1 | | 2/2007 | Schüler et al. |
| 2007/0060433 | A1 | | 3/2007 | Schüler et al. |
| 2007/0205647 | A1 | | 9/2007 | Bossmanns et al. |

FOREIGN PATENT DOCUMENTS

| | | |
|---|---|---|
| DE | 894 184 | 10/1953 |
| DE | 29 28 127 A1 | 2/1981 |
| DE | 33 21 883 A1 | 12/1984 |
| DE | 33 35 445 A1 | 4/1985 |
| DE | 256 904 A1 | 5/1988 |
| DE | 283 669 A5 | 10/1990 |
| DE | 197 09 852 A1 | 9/1998 |
| DE | 196 55 146 A1 | 4/2000 |
| DE | 101 44 840 A1 | 3/2003 |
| DE | 102 32 247 B3 | 3/2004 |
| DE | 10 2004 049 994 B3 | 3/2006 |
| EP | 1 128 979 B1 | 9/2001 |
| FR | 601 616 | 3/1926 |
| GB | 2 178 507 A | 2/1987 |
| WO | WO 01/04512 A1 | 1/2001 |
| WO | WO 2005/100078 A2 | 10/2005 |
| WO | WO 2005/100080 A2 | 10/2005 |
| WO | WO 2005/100081 A2 | 10/2005 |
| WO | WO 2005/100082 A2 | 10/2005 |
| WO | WO 2005/101622 A2 | 10/2005 |

OTHER PUBLICATIONS

W. Beitz and K.-H Küttner, "Dubbel, Handbook of Mechanical Engineering", pp. F110-F116, 1994 Edition, Springer-Verlag London Limited.

* cited by examiner

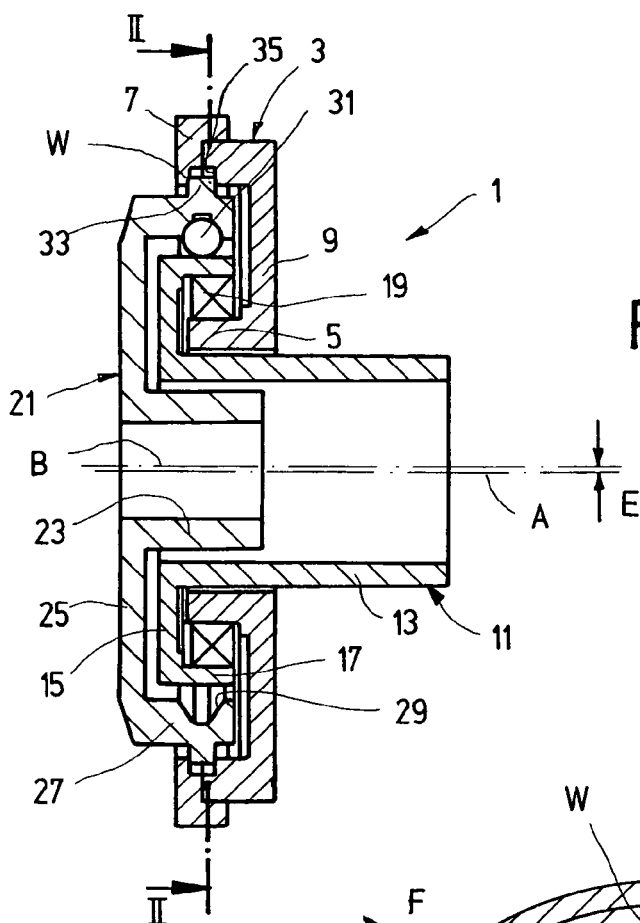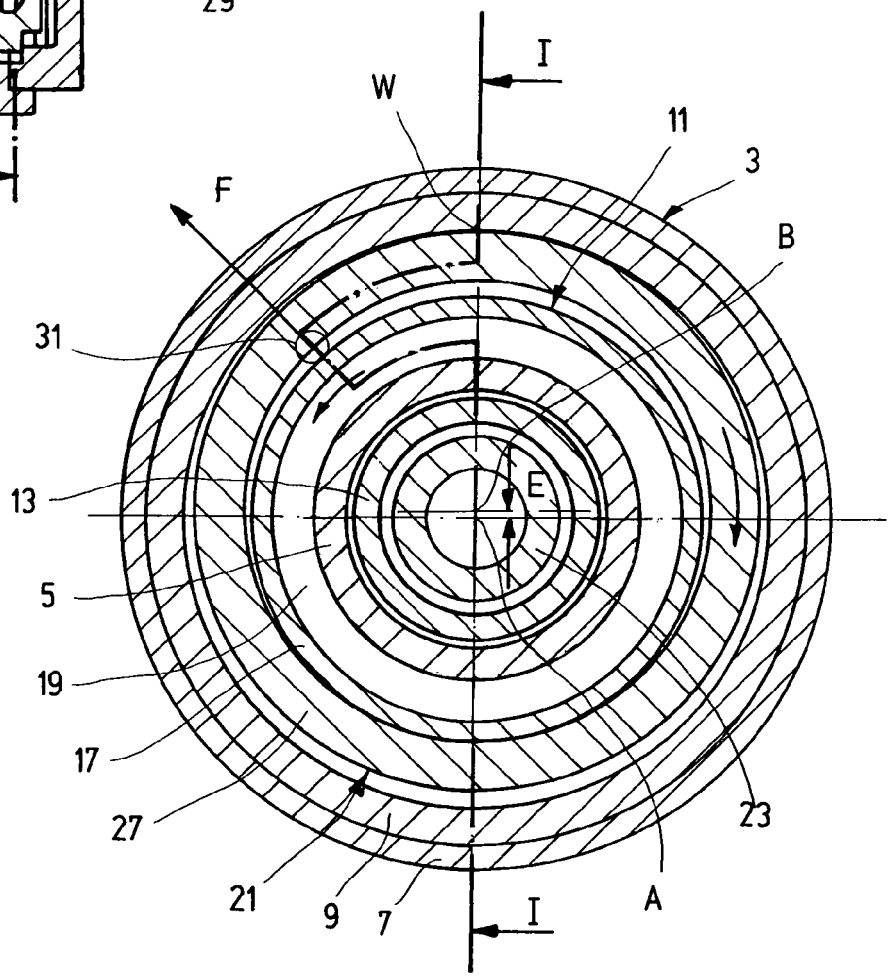

GEAR STAGE

CROSS-REFERENCE TO RELATED APPLICATION

The present application is a continuation of International Application PCT/EP2006/008102, which was filed Aug. 17, 2006. The entire disclosure of International Application PCT/EP2006/008102, which was filed Aug. 17, 2006, is incorporated herein by reference.

BACKGROUND OF THE INVENTION

The present invention relates to a gear stage of an actuator for a vehicle, especially one for a vehicle seat, comprising a housing, a drive mounted on the housing so that it can rotate about a first axis, and a driven output rotatable about a second axis different from the first axis.

DE 197 09 852 C2 discloses a gear stage of the type described immediately above, in which a worm on a motor shaft serves as a drive and meshes in a worm gear on the driven output. This gear stage is an integral part of an actuator, in which the worm gear then drives a mechanism for the adjustment of a vehicle seat. Through suitable thread leads on the worm and the worm gear, the gear stage gears down the high motor speed to a lower input speed of the mechanism.

BRIEF SUMMARY OF SOME ASPECTS OF THE INVENTION

An object of the present invention is to improve a gear stage of the type mentioned above. According to one aspect of the present invention, this object is achieved by a gear stage for an actuator for a vehicle, with the gear stage comprising a housing, a drive mounted to the housing for being rotated relative to the housing about a first axis, a driven output and at least one separately formed rolling element. The drive supports the driven output by way of at least the rolling element, to at least partially form a rolling eccentric. The driven output is for rotating relative to the housing about a second axis that is different from the first axis, the second axis is parallel to the first axis, and the second axis is offset from the first axis by an eccentricity. The rolling eccentric rotates in response the drive being rotated about the first axis. The driven output performs, by way of a friction gear tumbler mechanism and in response to rotation of the rolling eccentric, a rolling movement on the housing.

The transmission ratio is increased, compared to the known gear stage, in that the drive, by way of the at least one separately formed rolling element, supports the driven output with the axes offset parallel by the eccentricity and drives it as the rolling eccentric, thus formed, rotates, the driven output performing a rolling movement, especially a tumbling, rolling movement on the housing by way of the friction gear tumbler mechanism. At the same time, the efficiency is also significantly improved, so that the overall efficiency of an actuator, for example, in which the inventive gear stage is preferably used, is likewise improved, which affords a reduction in the weight and the overall space taken up by the requisite components. The driven output is seen to be "supported" by the drive in as much as the driven output can also be partially supported on the housing.

The rolling movement of the driven output is generally a rotational movement with a superimposed tumbling movement, although the tumbling, rolling movement can be compensated for, especially in the case of a small eccentricity, for example, by play between the driven output and the output-side mechanism to be driven (load-bearing mechanism) or the like, or through suitable elasticity of these parts. In the case of larger eccentricities, a further component, which forms the actual driven output of the gear stage and performs a rotational movement with a superimposed tumbling movement relative to the stressed driven output, but performs a pure rotational movement relative to the drive, can also be connected to the output side of the stressed driven output.

The rolling eccentric between the drive and the driven output to a certain extent contributes to the overall transmission ratio. By preferably forming a groove for the preferably spherical rolling element on one of the two components, making it possible to set different rolling radii through the use of inclined side walls, for example, improvements compared to a simple rolling of the rolling element are achieved both on the drive and on the driven output.

The friction gear tumbler mechanism, which in the case of a smaller eccentricity produces a slight tumbling relative movement between the driven output and the housing, makes a prime contribution to the overall transmission ratio. A rolling point, which preferably occurs between a hoop of the driven output and a guide in the housing, serves as the instantaneous pole for the tumbling, rolling movement of the driven output. Upon rotation of the drive, a force, preferably built up through a wedging of the drive, the rolling element and the driven output, exerts the driving moment on the driven output at the rolling point. Free turning of the drive once it has completed its driving rotation dissipates this force again and protects the components.

Favorable geometric ratios ensure definite, calculable relative movements. Two rolling elements tensioned against one another serve to prevent any idle travel at the beginning of the drive rotation, and the gear stage becomes self-locking. The inventive gear stage is preferably combined with electronically commutated motors and self-locking mechanisms with eccentric epicyclic gearing.

In a preferred embodiment, at least one of the transmission elements (the housing, the drive and/or the driven output), and preferably all of these transmission elements, are composed of a plastic-metal composite material. The metal parts contained therein ensure a high load-bearing capacity, while the plastic areas permit complex geometries, cost-effective manufacture, a lower weight and very good damping characteristics in the non-load absorbing areas. The metal parts are preferably made by machining from thin sheets of high-strength metal of approximately constant material thickness, which avoids expensive remachining.

Other aspects and advantages of the present invention will become apparent from the following.

BRIEF DESCRIPTION OF THE DRAWINGS

The invention will be explained in more detail below with reference to two exemplary embodiments shown in the drawings, in which:

FIG. 1 shows an axial section through the first exemplary embodiment along the line I-I in FIG. 2, FIG. 2 shows a radial section through the first exemplary embodiment along the line II-II in FIG. 1.

DETAILED DESCRIPTION OF EXEMPLARY EMBODIMENTS

Figure 3:
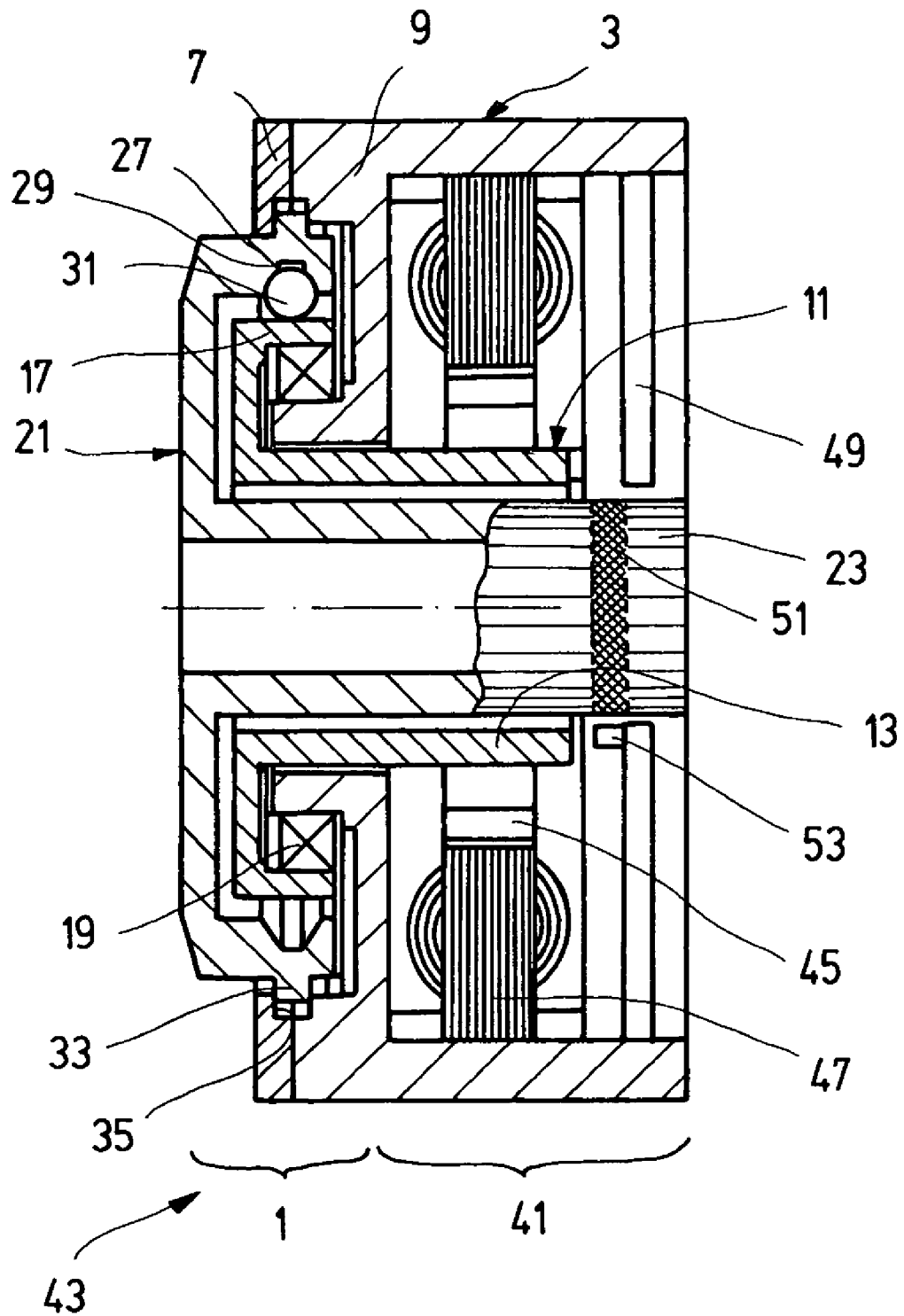
FIG. 3 shows a section corresponding to FIG. 1 through a first applied use of the invention.
Figure 4:
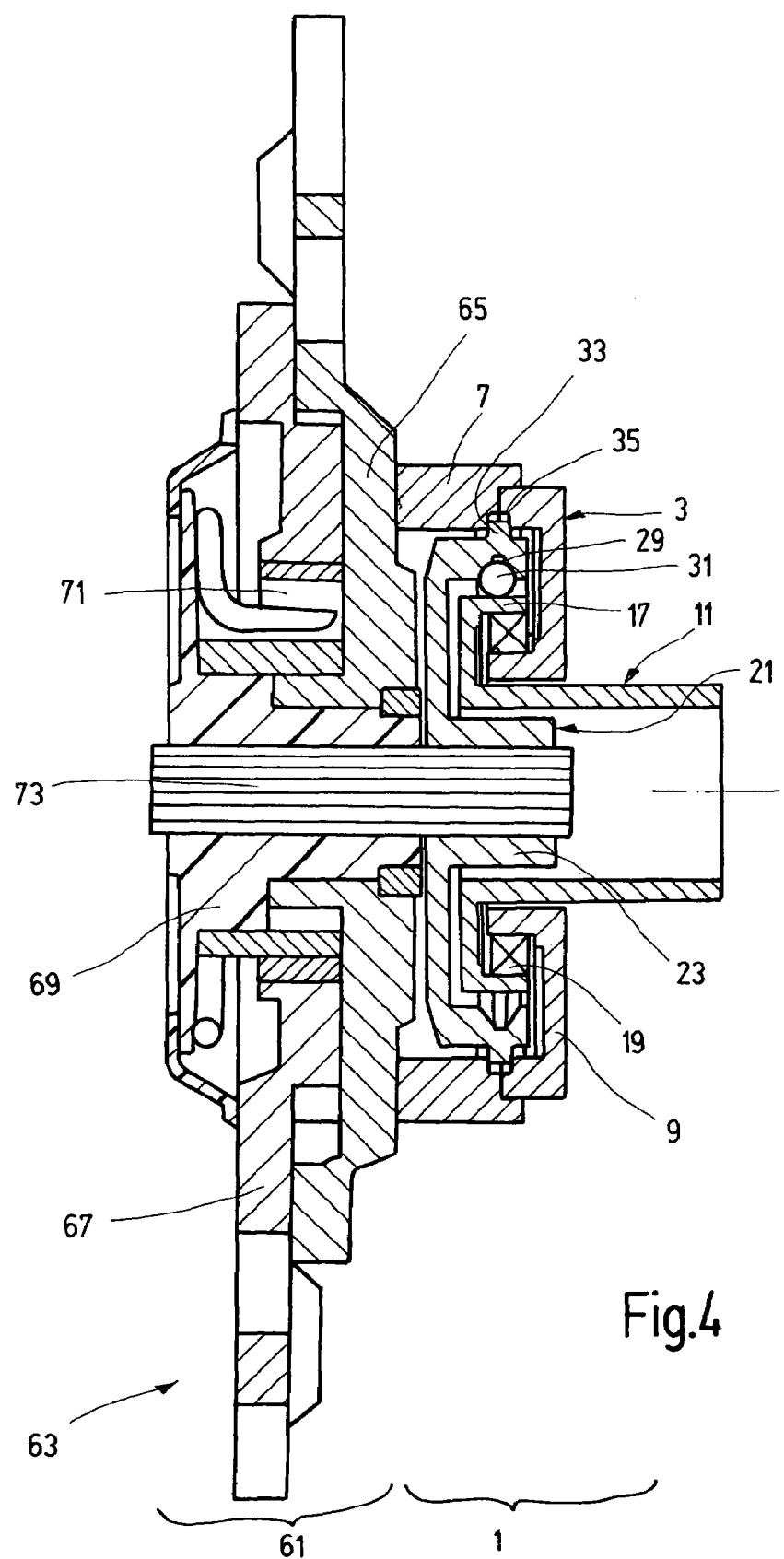
FIG. 4 shows a section corresponding to FIG. 1 through a second applied use of the invention.
Figure 5:
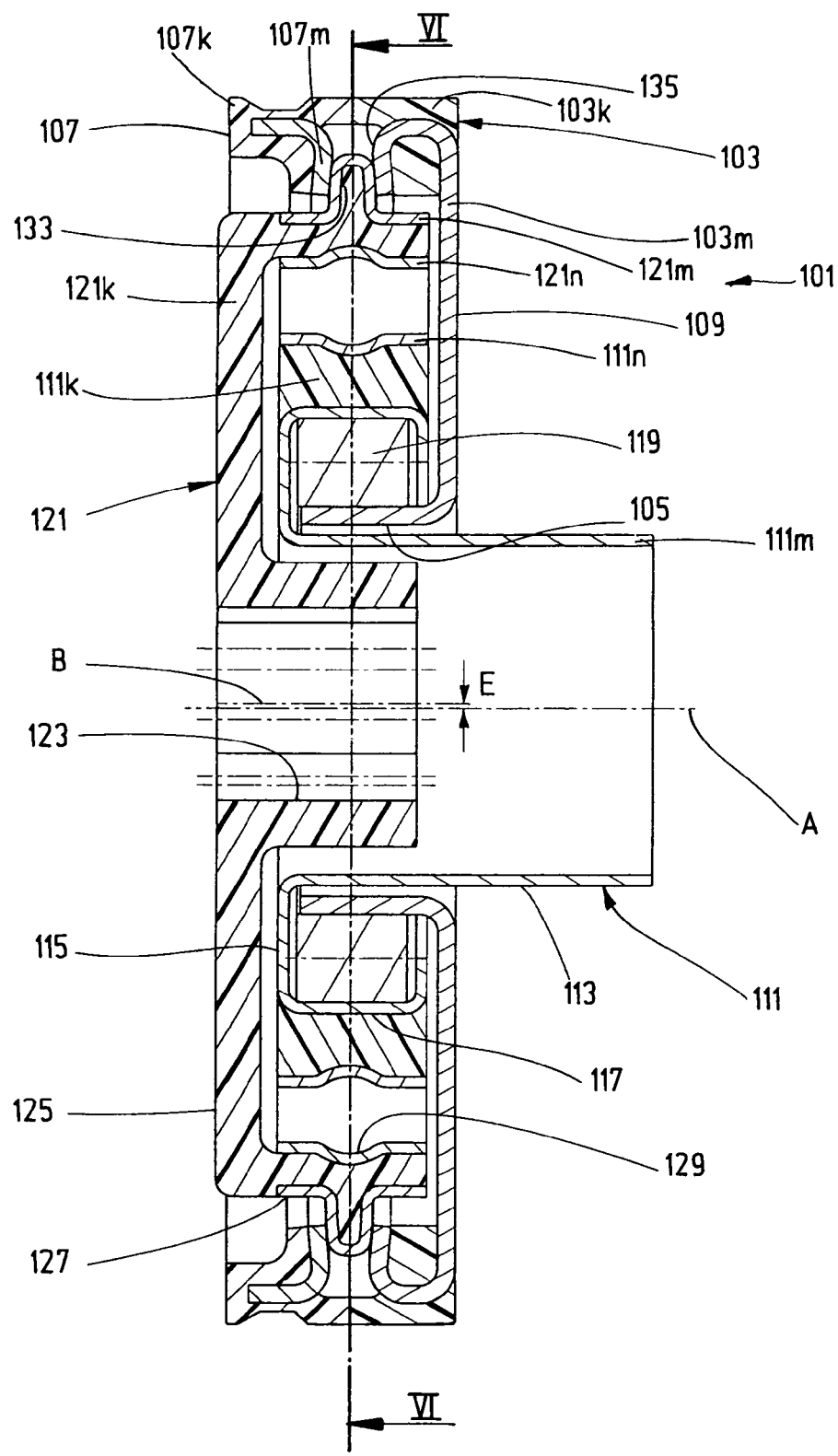
FIG. 5 shows an axial section through the second exemplary embodiment along the line V-V in FIG. 6.
Figure 6:
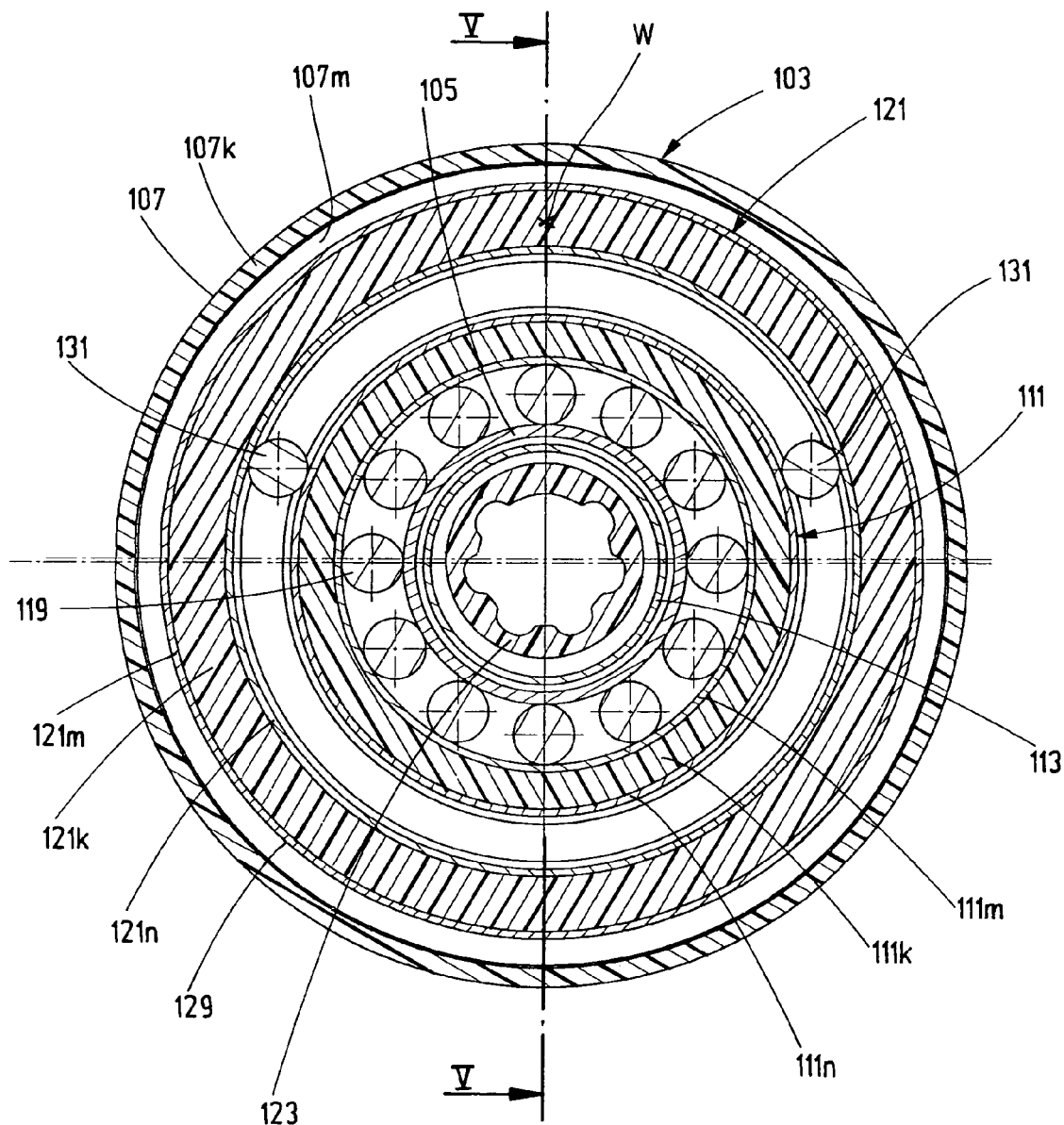
FIG. 6 shows a radial section through the second exemplary embodiment along the line VI-VI in FIG. 5.

In the first exemplary embodiment a gear stage 1 has an approximately cylindrically symmetrical housing 3 with a central first axis A. A housing collar 5 is formed radially inside on the housing 3 concentrically with the first axis A. Radially outside, the housing 3 has a housing cover 7, which is formed separately from a housing body 9 and is securely connected to the housing body 9 when assembling the gear stage 1. A drive 11 is likewise supported on the housing 3 concentrically with the first axis A. The drive 11 has a hollow cylindrical drive tube 13 inserted through the housing collar 5 concentrically with the first axis A, with a drive flange 15 protruding radially outwards at the end face and a drive bearing ring 17 formed thereon concentrically with the first axis A and overlapping the housing collar 5. A roller bearing 19, for example a ball bearing or preferably a needle bearing, is arranged between the inside of the drive bearing ring 17 and the outside of the housing collar 5. The roller bearing 19 directly supports (with little friction) the drive 11 in a radial direction.

A driven output 21 is cylindrically symmetrical about a second axis B, which is arranged parallel to the first axis A offset by an eccentricity E of preferably less than 0.5 mm, for example 0.2 mm. The driven output 21 has a hollow cylindrical driven output tube 23 concentric with the second axis B and inserted into the drive tube 13, a driven output disk 25 protruding radially outwards at the end face, and a driven output bearing ring 27 formed thereon concentrically with the second axis B and overlapping the drive bearing ring 17. On the inside of the driven output bearing ring 27 facing the drive bearing ring 17, the driven output 21 has an annular, peripheral V-shaped groove, abbreviated as groove 29. The side walls of the groove 29 preferably run obliquely to the second axis B, for example at 60° to the second axis B. A single ball 31 is arranged at a point on the periphery between the outside of the drive 11 (i.e. the outside of the drive bearing ring 17) and the groove 29, with the groove 29 partially receiving the ball 31.

On its outside, i.e. the outside of the driven output bearing ring 27, the driven output 21 has a peripheral, radially protruding hoop 33. The hoop 33 is formed concentrically with the second axis B and—in the manner of a tongue-and-groove connection—engages in a peripheral guide 35 in the housing 3. The channeled guide 35 is an annular groove that is concentric with first axis A. The channeled guide 35 is formed partly by the housing body 9 and partly by the housing cover 7. In this regard, the housing body 9 and the housing cover 7 together form a face of the housing 3/guide 35 that faces radially inwards.

The side walls of the guide 35 run slightly obliquely in relation to a plane perpendicular to the first axis A, so that the hoop 33 cannot penetrate fully to the bottom of the guide 35, but only as far as a rolling point W. The hoop 33, i.e. the driven output 21, and the guide 35, i.e. the housing 3, form a friction gear mechanism, hereinafter referred to as a friction gear tumbler mechanism. On the side radially opposite the rolling point W, the distance between the hoop 33 and the guide 35 or the driven output 21 and the housing 3 is 2×E greater than at the rolling point W. Likewise, the distance between the drive 11 and the driven output 21 at the point nearest to the rolling point W is 2×E greater than the corresponding distance on the radially opposite side. A quasi peripherally curved wedge face therefore exists both between the driven output 21 and the housing 3 and also between the driven output 21 and the drive 11. The contact points between the housing 3, the drive 11 and the driven output 21 lie substantially in the same plane, which runs perpendicular to the axes A and B.

The outside of the drive 11, the ball 31 and the groove 29 together form a geometry in which the ball 31 is wedged between the drive 11 and the driven output 21, since the contact angle is smaller than the self-locking angle and therefore no sliding friction occurs at the contact points of the ball 31, as is also known on wedging roller free-wheel clutches, for example. With the drive 11 stationary, the ball 31—viewed in the peripheral direction of the first axis A—initially lies at the same angle as the rolling point W and hence without any radial tensioning between the drive 11 and the groove 29. When the drive 11 is driven, on the other hand, the ball 31 also moves until the aforementioned wedging occurs. With the present geometries and materials, the ball 31 precedes the rolling point W by approximately 45° (preceding angle).

In FIG. 2 the drive 11 is driven counterclockwise, so that the ball 31 rolls on the outside of the driven output 11, i.e. it rotates clockwise in FIG. 2. This leads to a relative rolling movement of the ball 31 in the groove 29 and due to the wedging leads to a considerable force F at the contact point between the ball 31 and the driven output 21. Since the driven output 21 bears against the housing 3 at the rolling point W, i.e. the rolling point W forms an instantaneous pole, the force F generates a torque acting on the driven output 21 about the rolling point W. This leads to a tumbling, rolling movement of the driven output 21 on the housing 3, clockwise in FIG. 2. If the direction of rotation of the drive 11 is reversed, the direction of rotation of the driven output 21 is likewise reversed after an idle travel of twice the preceding angle of the ball 31. A suitable lubricant may be provided in order to increase the instantaneous coefficients of friction at the points with a higher surface unit pressure, while reducing the wear on the ball 31 or the rolling point W, for example.

The gear stage 1 is of two-stage design, being embodied as a friction gear tumbler mechanism with rolling eccentric. Because of the rolling movement of the ball 31 between the drive 11 and the driven output 21, the rolling eccentric with the ball 31 initially has a theoretical transmission ratio of approximately 2:1. The groove 29, which provides for a smaller rolling radius towards the driven output 21 than the radius of the ball 31, gives rise to an additional transmission component of in this case 4:1. The friction gear tumbler mechanism stage gives rise to a transmission ratio component approximately equal to the outside diameter of the driven output 21 (diameter of the housing 3 at the rolling point W) of 2×E, in this case about 125:1. Overall therefore, the rotation of the drive 11 can be geared down by several orders of magnitude. As the eccentricity E decreases, the disruptive effects diminish and the transmission ratio (or the reduction ratio) increases. In order that the transmission elements can withstand the contact forces and stresses resulting from the drive torques without being destroyed, high-strength metal materials are preferably used for this purpose. It is also feasible, however, by using high-strength plastics, to give the driven output 21 an elastic surface, for example, in order to damp vibrations and to provide significantly larger contact surfaces.

In order to prevent the formation of non-circular surfaces when at a standstill, provision is preferably made, when no longer in use, to turn the drive 11 back by a free-turning angle (fixed default of 90°, for example, or electronically determined), in order that the ball 31 can roll back by its preceding angle and come to rest in the closest possible proximity to the rolling point W, where it no longer builds up any force F.

In order to improve the contact of the ball 31 on the drive 11 during operation, thereby also improving the wedging action, i.e. in order as far as possible to avoid "slipping" at this point, in a modified embodiment there is preferably always a slight friction between the drive 11 and the ball 31, without impeding the rotation. This slight friction may be applied, for example, by way of the normal force of a spring between the drive 11 and the ball 31 or by magnetizing one of the components. In order to reduce the idle travel of the ball 31 on reversing the direction, in a modified embodiment two balls 31 may be provided, which are held together or apart by springs. The gear stage 1 thereby also becomes self-locking.

In a first applied example the inventive gear stage 1 is combined with a motor 41 to form a drive unit 43. In this case the gear stage 1 and the motor 41 are integrated into one another by fitting multiple permanent magnets as rotor magnets 45 to the drive 11, preferably to the drive tube 13, so that the drive 11 becomes a rotor, and by arranging multiple stator stacks 47 in the housing 3 for contact-free interaction with the rotor magnets 45. A control 49 provides for electronic commutation of the stator stacks 47 and hence of the motor 41. For speed control via a feedback, an annular magnet 51 is fitted to the driven output 21, preferably to the driven output tube 23, and interacts with a Hall sensor 53 in the housing 3 connected to the control 49, in order to detect the angular position of the driven output 21. Except for the electronic components of the motor 41, the gear stage 1 forms one coatable unit.

In a second applied example the inventive gear stage 1 is combined with a mechanism 61 to form an actuator 63 in a vehicle, especially one for a vehicle seat. Such a mechanism 61 is described in the form of a seat back inclination adjuster for a vehicle seat in DE 101 44 840 A1, the entire disclosure content of which is expressly incorporated herein by reference. The mechanism 61 embodied as a self-locking eccentric epicyclic gearing has a first fitting 65, which takes the form of an internal gear, and a second fitting 67, which has a formed-on gear meshing with the internal gear. The first fitting 65 is firmly connected to the backrest of the vehicle seat, for example, while the second fitting 67 is connected to the seat part of the vehicle seat. A two-part (or alternatively single-part) driver 69 together with two wedge segments 71 tensioned against one another defines an eccentric, which is supported between the first fitting 65 and the second fitting 67 and on rotation produces a tumbling, rolling movement of the first fitting 65 against the second fitting 67.

For combining the gear stage 1 with the mechanism 61, the housing 3 is fitted by way of its housing cover 7 to the first fitting 65, while an externally profiled shaft 73 at one end meshes in an internal profile of the driven output tube 23 and at the other end in an internal profile of the driver 69. Here some play is in each case provided between the profiles, in order to compensate for the tumbling movement of the driven output 21. The tumbling movement could also be compensated for by other means, in particular flexible means (e.g., flexible mechanisms).

The actuator 63 might also (e.g., alternatively) adjust the height and/or the inclination of the seat surface of the vehicle seat.

By combining the first and second applied examples, the actuator 63 is completed by a motor 41.

Unless otherwise described below, the second exemplary embodiment is identical to the first exemplary embodiment, for which reason identical or similarly functioning components carry the same reference numerals prefixed by 100. Individual or multiple features of the first exemplary embodiment can also be embodied in combination with the features of the second exemplary embodiment and vice-versa.

In the second exemplary embodiment a gear stage 101 has an approximately cylindrically symmetrical housing 103 with a central first axis A. A housing collar 105 is formed radially inside on the housing 103 concentrically with the first axis A. Radially outside, the housing 103 has a housing cover 107, which is formed separately from a housing body 109 and is securely connected to the housing body 109 when assembling the gear stage 101. A drive 111 is likewise supported on the housing 103 concentrically with the first axis A. The drive 111 has a hollow cylindrical drive tube 113 inserted through the housing collar 105 concentrically with the first axis A, with a drive flange 115 protruding radially outwards at the end face and a drive bearing ring 117 formed thereon concentrically with the first axis A and overlapping the housing collar 105. A roller bearing 119, for example a ball bearing or preferably a needle bearing, is arranged between the inside of the drive bearing ring 117 and the outside of the gear collar 105. The roller bearing directly supports (with little friction) the drive 111 in a radial direction (in relation to the first axis A).

A driven output 121 is cylindrically symmetrical about a second axis B, which is arranged parallel to the first axis A offset by an eccentricity E of preferably less than 0.5 mm, for example 0.2 mm. The driven output 121 has a hollow cylindrical driven output tube 123 concentric with the second axis B and inserted into the drive tube 113, a driven output disk 125 protruding radially outwards at the end face, and a driven output bearing ring 127 formed thereon concentrically with the second axis B and overlapping the drive bearing ring 117. On the inside of the driven output bearing ring 127 facing the drive bearing ring 117, the driven output 121 has an annular, peripheral V-shaped groove 129 of curved profile. Two single balls 131 are each arranged at a point on the periphery between the outside of the drive 111 (i.e. the outside of the drive bearing ring 117) and the groove 129, with the groove 129 partially receiving the balls 131.

On its outside, i.e. the outside of the driven output bearing ring 127, the driven output 121 has a peripheral, radially protruding hoop 133. The hoop 133 is formed on concentrically with the second axis B and—in the manner of a tongue-and-groove connection—engages in a peripheral guide 135 in the housing 103. The channeled guide 135 is an annular groove that is concentric with first axis A. The channeled guide 135 is formed partly by the housing body 109 and partly by the housing cover 107. In this regard, the housing body 109 and the housing cover 107 together form a face of the housing 103/guide 135 that faces radially inwards.

The side walls of the guide 135 run slightly obliquely in relation to a plane perpendicular to the first axis A, so that the hoop 133 cannot penetrate fully to the bottom of the guide 135, but only as far as a rolling point W. The hoop 133, i.e. the driven output 121, and the guide 135, i.e. the housing 103, form a friction gear mechanism, hereinafter referred to as a friction gear tumbler mechanism. On the side radially opposite the rolling point W, the distance between the hoop 133 and the guide 135 or the driven output 121 and the housing 103 is 2×E greater than at the rolling point W. Likewise, the distance between the drive 111 and the driven output 121 at the point nearest to the rolling point W is 2×E greater than the corresponding distance on the radially opposite side. A quasi peripherally curved wedge face therefore exists both between the driven output 121 and the housing 103 and also between the driven output 121 and the drive 111. The contact points between the housing 103, the drive 111 and the driven output 121 lie substantially in the same plane, which runs perpendicular to the axes A and B.

The outside of the drive 111, the balls 131 and the groove 129 together form a geometry in which the balls 131 preceding the rolling point W (by a preceding angle) can be wedged between the drive 111 and the driven output 121, since the contact angle is smaller than the self-locking angle and therefore no sliding friction occurs at the contact points of the balls 131, as is also known on wedging roller free-wheel clutches, for example. Accordingly, the ball 131 following the rolling point W does not wedge. When the drive 111 is driven, the balls 131 roll on the outside of the driven output 111. This leads to a relative rolling movement of the balls 131 in the groove 129 and due to the wedging of the preceding ball leads to a considerable force at the contact point between the preceding ball 131 and the driven output 121. Since the driven output 121 bears against the housing 103 at the rolling point W, i.e. the rolling point W forms an instantaneous pole, the force generates a torque acting on the driven output 121 about the rolling point W. This leads to a tumbling, rolling movement of the driven output 121 against the housing 103. If the direction of rotation of the drive 111 is reversed, the direction of rotation of the driven output 121 is likewise reversed after a minimal idle travel (until the other ball 131 wedges). A suitable lubricant may be provided in order to increase the instantaneous coefficients of friction at the points with a higher surface unit pressure, while reducing the wear on the balls 131 or the rolling point W, for example. If the balls 131 are compressed or held apart by springs (e.g., biased with respect to one another), the gear stage 101 becomes self-locking.

The gear stage 101 is of two-stage design, being embodied as a friction gear tumbler mechanism with rolling eccentric. Because of the rolling movement of the balls 131 between the drive 111 and the driven output 121, the rolling eccentric with the balls 131 initially has a theoretical transmission ratio of approximately 2:1. The groove 129, which provides for a smaller rolling radius towards the driven output 121 than the radius of the balls 131, gives rise to an additional transmission component of in this case 4:1. The friction gear tumbler mechanism stage gives rise to a transmission ratio component approximately equal to the outside diameter of the driven output 121 (diameter of the housing 103 at the rolling point W) of 2×E, in this case about 125:1. Overall therefore, the rotation of the drive 111 can be geared down by several orders of magnitude. As the eccentricity E decreases the disruptive effects diminish and the transmission ratio (or the reduction ratio) increases.

At least one of the transmission elements: the housing 103, the drive 111 and the driven output 121, and preferably all of these, are composed of a plastic-metal composite material. The metal parts contained therein allow the transmission elements to withstand the contact forces and stresses resulting from the drive torques without being destroyed. Manufacturing from thin sheets of high-strength metal (preferably steel) is preferred, since deep drawing, punching and stamping or the like afford the necessary precision and surface quality without additional remachining. Heat treatment serves to improve the strength characteristics. The associated metal parts are molded into preferably high-strength plastics and thereby joined together. The plastic areas permit complex geometries and cost-effective manufacture in the non-load bearing areas, a lower weight and very good damping characteristics, and hence an improved noise behavior, and if necessary a flexible surface for vibration damping and significantly larger contact areas. Unless otherwise specified, the metal parts in the second exemplary embodiment have an at least approximately constant material thickness, while the plastic areas occupy the remaining space of the corresponding transmission elements.

In the second exemplary embodiment the housing 103 has a metal part 103m. The metal part 103m forms/extends from the housing collar 105, across the housing body, 109 to the guide 135, where the metal part 103m bears against the hoop 133. Otherwise, the housing body 109 is formed by a plastic area 103k of the housing 103. The housing cover 107 assigned to the housing 103 has a metal part 107m. The metal part 107m extends up to the guide 135, to bear against the hoop 133. The remainder of the housing 103 is in the form of a plastic area 107k. The respective plastic areas 103k and 107k are ultrasonically welded together to join the housing 103 and the housing cover 107.

The drive 111 has a first metal part 111m and a second metal part 111n. The first metal part 111m forms/extends from the drive tube 113 via the drive flange 115 to the side of the drive bearing ring 117 facing the roller bearing 119. The second metal part 111n is arranged on the side of the drive bearing ring 117 facing the balls 131. The remainder of the drive 111 is in the form of a plastic area 111k that is in the drive bearing ring 117.

The driven output 121 has a first metal part 121m and a second metal part 121n. The first metal part 121m is part of the driven output bearing ring 127, and is arranged on the side facing the housing 103 and the housing cover 107, where the first metal part 121m extends over/partially forms the hoop 133. The second metal part 121n is part of the driven output bearing ring 127 on the side facing the balls 131. The plastic area 121k of the driven output 121 extends from the inside of the driven output bearing ring 127 over the entire driven output disk 125 and the entire driven output tube 123.

Like the first exemplary embodiment, the gear stage 101 may be combined with a motor to form a drive unit and/or with a mechanism to form an actuator, for adjusting the inclination of a backrest of a vehicle seat, for example.

It will be understood by those skilled in the art that while the present invention has been discussed above with reference to exemplary embodiments, various additions, modifications and changes can be made thereto without departing from the spirit and scope of the invention as set forth in the following claims.

That which is claimed:

1. A gear stage for an actuator for a vehicle, the gear stage comprising:
   a housing;
   a drive mounted to the housing for being rotated relative to the housing about a first axis;
   a driven output; and
   at least one separately formed rolling element, wherein
   the rolling element is partially positioned in and rolls in an annular peripheral groove in response to the drive being rotated about the first axis,
   the annular peripheral groove is positioned in a first component selected from the group consisting of the driven output and the drive,
   the rolling element rolls on an outside or an inside of a second component, which is not the first component and is selected from the group consisting of the driven output and the drive, in response to the drive being rotated about the first axis,
   the drive supports the driven output by way of at least the rolling element, to at least partially form a rolling eccentric, the driven output is for rotating relative to the housing about a second axis that is different from the first axis, the second axis is parallel to the first axis, and the second axis is offset from the first axis by an eccentricity, the rolling eccentric rotates in response the drive being rotated about the first axis, the driven output performs, by way of a friction gear tumbler mechanism and in response to rotation of the rolling eccentric, a tumbling rolling movement on the housing, the driven output bears against the housing at a rolling point, and the rolling point forms an instantaneous pole for the tumbling rolling movement of the driven output.

2. The gear stage according to claim 1, wherein the gear stage is configured so that the rolling element rolls on both the drive and the driven output in response to the drive being rotated about the first axis.

3. The gear stage according to claim 1, wherein:
the rolling element is a ball; and
the annular peripheral groove comprises side walls that extend obliquely to a plane that is perpendicular to the first and second axes.

4. The gear stage according to claim 2, wherein the gear stage is configured so that, in response to the drive being rotated about the first axis, the rolling element wedges between the drive and the driven output and builds up a force.

5. The gear stage according to claim 1, wherein the rotation of the rolling eccentric produces a reduction ratio of more than 2:1.

6. The gear stage according to claim 1, wherein the eccentricity is less than or equal to 0.5 mm.

7. The gear stage according to claim 1, wherein an annular peripheral guide and a peripheral hoop form the friction gear tumbler mechanism between the housing and the driven output.

8. The gear stage according to claim 1, wherein the gear stage is configured so that:
in response to the drive being rotated about the first axis, the rolling element wedges between the drive and the driven output and builds up a force; and
as the drive rotates, the rolling element precedes the rolling point in the direction of rotation, so that the force at the rolling point exerts a moment on the driven output.

9. The gear stage according to claim 8, wherein:
the drive being rotated comprises the drive being rotated in a first direction; and
the gear stage is configured so that, after the drive is rotated in the first direction and released, the drive rotates in a second direction, which is opposite from the first direction, so that the rolling element is brought into a closer proximity with the rolling point.

10. The gear stage according to claim 1, comprising a roller bearing, wherein the drive is supported on the housing by way of the roller bearing.

11. The gear stage according to claim 1, wherein contact points between the housing, the drive and the driven output lie substantially in one plane that extends perpendicular to the axes.

12. The gear stage according to claim 1, comprising means for compensating for the tumbling rolling movement of the driven output.

13. The gear stage according to claim 1, wherein:
the at least one separately formed rolling element comprises a first rolling element and a second rolling element;
the drive supports the driven output by way of both the first rolling element and the second rolling element;

the first rolling element precedes the rolling point; and
the second rolling element follows the rolling point.

14. The gear stage according to claim 13, wherein the first and second rolling elements are biased with respect to one another.

15. The gear stage according to claim 1, in combination with an electronically commutated motor.

16. The combination according to claim 15, wherein:
both the gear stage and the electronically commutated motor are integrated into a common drive unit;
the housing carries stator stacks; and
the drive carries rotor magnets.

17. The combination according to claim 15, comprising means for detecting angular position of the driven output.

18. The gear stage according to claim 1, in combination with a mechanism having a self-locking eccentric epicyclic gearing.

19. The combination according to claim 18, further in combination with a shaft, wherein:
the mechanism includes a driver; and
the driven output of the gear stage drives the driver of the mechanism by way of the shaft.

20. The gear stage according to claim 1, comprising a lubricant, wherein the lubricant is operative under high surface unit pressures to allow high coefficients of friction for a small amount of wear.

21. The gear stage according to claim 1, wherein at least one transmission element, which is selected from the group consisting of the housing, the drive and the driven output, comprises a plastic-metal composite material.

22. The gear stage according to claim 21, wherein:
the transmission element includes at least one metal part and at least one plastic area, and
the metal part has at least an approximately constant material thickness.

23. The gear stage according to claim 21, wherein:
the transmission element includes at least one metal part and at least one plastic area, and
the metal part is a thin sheet of a high-strength metal.

24. The gear stage according to claim 21, wherein:
the transmission element includes at least one metal part and at least one plastic area, and
the metal part is manufactured without any remachining.

25. The gear stage according to claim 21, wherein the transmission element includes at least one metal part that is molded into plastic, so that the metal part and the plastic are joined together.

26. The gear stage according to claim 1, in combination with an electronically commutated motor, wherein the combination is configured as a drive unit.

27. The gear stage according to claim 1, in combination with the actuator, wherein the combination is configured so that the gear stage is for driving the actuator.

28. The gear stage according to claim 1, in combination with a vehicle seat that includes the actuator, wherein the gear stage is operatively associated with the actuator, and the combination further includes a motor for driving the gear stage and thereby the actuator, to adjust at least a portion of the vehicle seat.

29. The gear stage according to claim 7, wherein:
the hoop is formed on the driven output, and
the guide is formed on the housing.

30. The gear stage according to claim 1, wherein the annular peripheral groove is defined by the first component.

31. The gear stage according to claim 30, wherein the first component is the driven output.

32. The gear stage according to claim 1, wherein the annular peripheral groove comprises a side wall of the first component, and the side walls extends obliquely to a plane that is perpendicular to the first and second axes.

33. A gear stage for an actuator for a vehicle, the gear stage comprising:

a housing;

a drive;

an annular bearing positioned between the drive and the housing, and supporting the drive on the housing so that the drive is for being rotated relative to the housing about a first axis;

a driven output;

at least one separately formed rolling element that is positioned between the drive and the driven output, so that the rolling element rolls on both the drive and the driven output in response to the drive being rotated about the first axis, comprising the rolling element being partially positioned in and rolling in an annular peripheral groove in response to the drive being rotated about the first axis, the annular peripheral groove being defined by a first component selected from the group consisting of the driven output and the drive, the rolling element rolling on an outside or an inside of a second component in response to the drive being rotated about the first axis, the second component not being the first component, and the second component being selected from the group consisting of the driven output and the drive; and the drive supporting the driven output by way of at least the rolling element, to at least partially form a rolling eccentric, wherein the driven output is for rotating relative to the housing about a second axis that is different from the first axis, the second axis is parallel to the first axis, and the second axis is offset from the first axis by an eccentricity, the rolling eccentric rotates in response the drive being rotated about the first axis, the driven output performs, by way of a friction gear tumbler mechanism and in response to rotation of the rolling eccentric, a tumbling rolling movement on the housing, the driven output bears against the housing at a rolling point, and the rolling point forms an instantaneous pole for the tumbling rolling movement of the driven output.

\* \* \* \* \*